United States Patent
Wang et al.

(10) Patent No.: US 10,375,399 B2
(45) Date of Patent: Aug. 6, 2019

(54) METHODS AND SYSTEMS OF GENERATING A BACKGROUND PICTURE FOR VIDEO CODING

(71) Applicant: QUALCOMM Incorporated, San Diego, CA (US)

(72) Inventors: Lei Wang, Clovis, CA (US); Ying Chen, San Diego, CA (US); Ning Bi, San Diego, CA (US); Xuerui Zhang, San Diego, CA (US); Lei Ma, San Diego, CA (US); Chinchuan Chiu, Poway, CA (US); Jianfeng Ren, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 15/134,183

(22) Filed: Apr. 20, 2016

(65) Prior Publication Data
US 2017/0310972 A1  Oct. 26, 2017

(51) Int. Cl.
*H04N 19/159* (2014.01)
*H04N 19/105* (2014.01)
*H04N 19/172* (2014.01)
*H04N 19/182* (2014.01)
*H04N 19/58* (2014.01)
(Continued)

(52) U.S. Cl.
CPC .......... *H04N 19/159* (2014.11); *G06T 7/254* (2017.01); *H04N 19/105* (2014.11); *H04N 19/172* (2014.11); *H04N 19/182* (2014.11); *H04N 19/23* (2014.11); *H04N 19/58* (2014.11)

(58) Field of Classification Search
None
See application file for complete search history.

(56) References Cited

U.S. PATENT DOCUMENTS

2008/0247599 A1   10/2008  Porikli et al.
2012/0173577 A1*  7/2012  Millar ................. G06F 17/3079
                                                              707/780
(Continued)

OTHER PUBLICATIONS

Zivkovic Z., et al., "Efficient Adaptive Density Estimation Per Image Pixel for the Task of Background Subtraction," Pattern Recognition Letters, May 2006, vol. 27, (7), pp. 773-780.
(Continued)

*Primary Examiner* — Kate H Luo
(74) *Attorney, Agent, or Firm* — Polsinelli LLP

(57) ABSTRACT

Techniques and systems are provided for generating a background picture. The background picture can be used for coding one or more pictures. For example, a method of generating a background picture includes generating a long-term background model for one or more pixels of a background picture. The long-term background model includes a statistical model for detecting long-term motion of the one or more pixels in a sequence of pictures. The method further includes generating a short-term background model for the one or more pixels of the background picture. The short-term background model detects short-term motion of the one or more pixels between two or more pictures. The method further includes determining a value for the one or more pixels of the background picture using the long-term background model and the short-term background model.

30 Claims, 8 Drawing Sheets

(51) Int. Cl.
    *H04N 19/23*      (2014.01)
    *G06T 7/254*      (2017.01)

(56) References Cited

U.S. PATENT DOCUMENTS

| 2013/0028467 A9 | 1/2013 | Millar et al. |
| 2013/0128050 A1 | 5/2013 | Aghdasi et al. |
| 2013/0170557 A1 | 7/2013 | Wang et al. |

OTHER PUBLICATIONS

International Search Report and Written Opinion—PCT/US2017/019854—ISA/EPO—dated May 26, 2017.
Li S., et al., "Moving Object Detection and Tracking in Video Surveillance System", Nov. 1, 2009, XP040503346, 14 pages, DOI: 10.1117/12.834068.
Mukawa N., et al., "Uncovered Background Prediction in InterFrame Coding", IEEE Transactions on Communications, vol. COM-33, No. 11, Nov. 1, 1985, XP000946265, pp. 1227-1231, ISSN: 0090-6778, DOI: 10.1109/TCOM.1985.1096229.
Stauffer C et al: "Adaptive background mixture models for real-time tracking", Proceedings of the 1999 IEEE Computer Society Conference on Computer Vision and Pattern Recognition, Jun. 23-25, 1999; Fort Collins, Colorado, IEEE, The Institute of Electrical and Electronics Engineers, Inc, US, vol. 2, Jun. 23, 1999 (Jun. 23, 1999), pp. 246-252, XP010347611, ISBN: 978-0-7695-0149-9.
Jin T., et al., "Moving Vehicles Detection in Airborne Video," Information Science and Engineering, 2008. ISISE '08. International Symposium on, IEEE, Piscataway, NJ, USA, Dec. 20, 2008 (Dec. 20, 2008), pp. 697-701, XP031383306.

\* cited by examiner

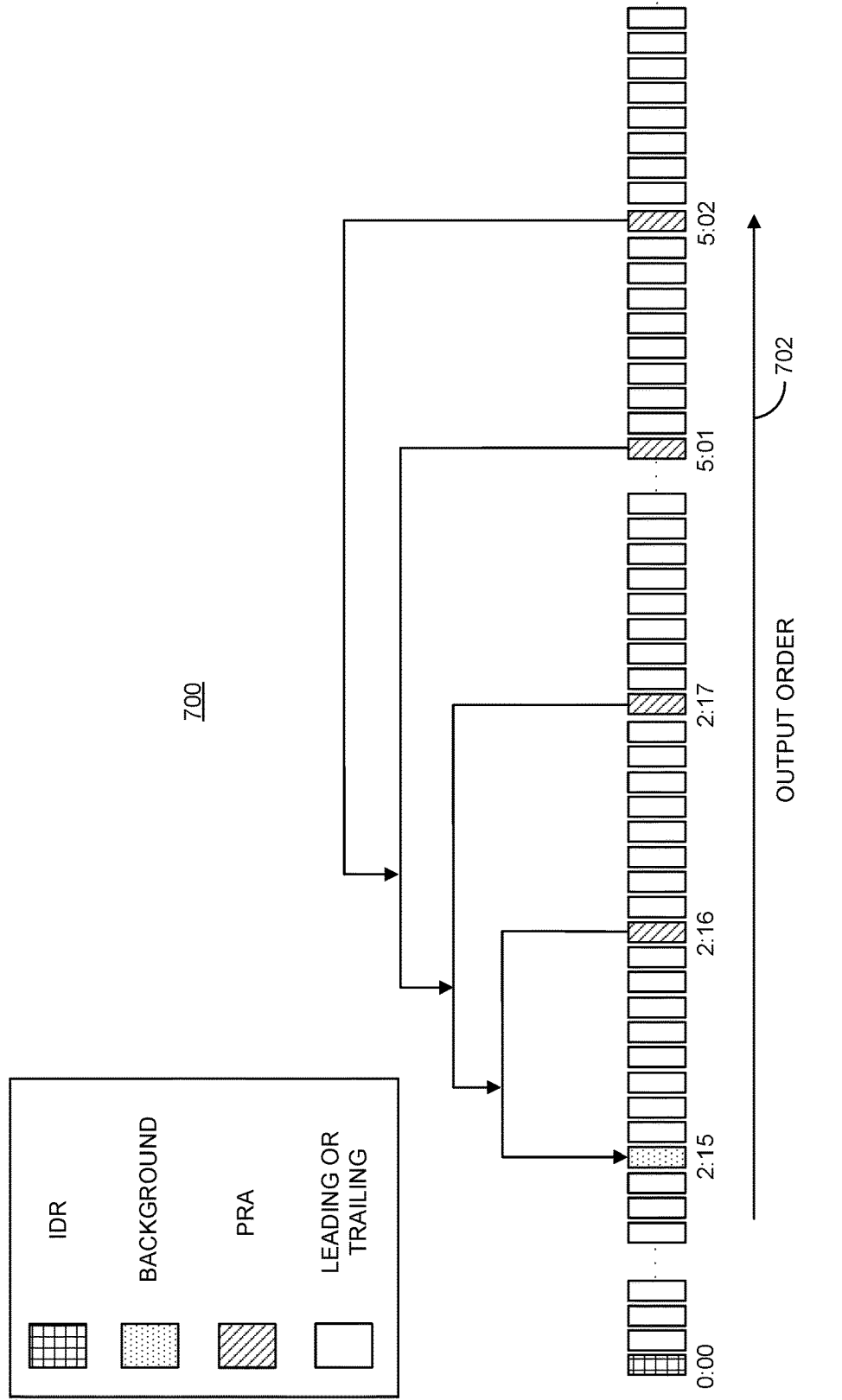

800

GENERATE A LONG-TERM BACKGROUND MODEL FOR ONE OR MORE PIXELS OF A BACKGROUND PICTURE, THE LONG TERM MODEL INCLUDING A STATISTICAL MODEL FOR DETECTING LONG-TERM MOTION OF THE ONE OR MORE PIXELS IN A SEQUENCE OF PICTURES
802

GENERATE A SHORT-TERM BACKGROUND MODEL FOR THE ONE OR MORE PIXELS OF THE BACKGROUND PICTURE, THE SHORT TERM MODEL DETECTING SHORT-TERM MOTION OF THE ONE OR MORE PIXELS BETWEEN TWO OR MORE PICTURES
804

DETERMINE A VALUE FOR THE ONE OR MORE PIXELS OF THE BACKGROUND PICTURE USING THE LONG-TERM BACKGROUND MODEL AND THE SHORT-TERM BACKGROUND MODEL, WHEREIN THE BACKGROUND PICTURE IS USED FOR CODING ONE OR MORE PICTURES
806

FIG. 8

METHODS AND SYSTEMS OF GENERATING A BACKGROUND PICTURE FOR VIDEO CODING

FIELD

The present disclosure generally relates to background picture generation, and more specifically to techniques and systems for reference background picture generation for video coding.

BACKGROUND

Many devices and systems allow video data to be processed and output for consumption. For example, an Internet protocol camera (IP camera) is a type of digital video camera that can be employed for surveillance or other applications. Unlike analog closed circuit television (CCTV) cameras, an IP camera can send and receive data via a computer network and the Internet. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some embodiments, techniques and systems are described for background picture generation. For example, one or more background pictures are generated for use as reference pictures for video coding. One or more pictures can be encoded into a video bitstream using inter-prediction based on a background picture as a reference picture. The encoded pictures can be decoded using inter-prediction based on the background picture.

In some examples, a long-term background model and a short-term background model may be generated and maintained simultaneously for a pixel location or for a unit of pixel locations. A long-term background model can be used to detect long-term motion of one or more pixel locations (and the corresponding pixels) across a sequence of captured pictures. The short-term background model can be used to detect short-term motion of the one or more pixel locations (and the corresponding pixels) between a number of the captured pictures (e.g., between consecutive pictures, or among several pictures). In some embodiments, a long-term background model and a short-term background model can be maintained for each pixel location in a sequence of pictures. In some embodiments, a long-term background model and a short-term background model can be maintained for a unit of pixel locations in the sequence of pictures. In some examples, a long-term background model for a pixel or unit of pixels includes a single statistical model (e.g., a Gaussian model). In some examples, the short-term background model includes a frame comparison model.

The long-term background model and short-term background model for a pixel (or unit) location can be used to determine when to update the corresponding pixel (or unit) location in a target background picture as a background pixel. In some examples, for each pixel or unit, the corresponding pixel intensity of a target background picture is updated when neither the long-term model nor the short-term model indicates foreground object motion (also referred to as background motion) for the pixel or unit. For example, when considering a current input picture, the target background picture will be updated for each pixel or unit only when both the long-term and short-term models for the pixel or unit detect change within limited ranges (indicating no foreground object motion). In some examples, input pictures (or frames) can be considered one by one in capture or display order, and therefore the methods can adapt and change according to the received pictures.

In some examples, a current input frame can be available for use as a background picture. For example, instead of using a synthetic background picture, a reference background picture can include an actual captured frame when certain conditions are met. In one example, when short-term background motion (detected using the short-term background model) is sparse for a period of time or a period of pictures, an entire current background picture can be updated to include the current input frame.

In some embodiments, techniques and systems are described for updating the long-term background model when the background is changed. For example, the long-term background model may be intelligently updated based on a foreground model that keeps track of the changes in a scene. In one example, a foreground model can include a mixture of statistical models (e.g., a Gaussian mixture model (GMM)) with two or more statistical models. The foreground model can be generated and maintained to model the foreground pixels detected in a sequence of pictures. For example, a pixel or unit of pixels can be considered as foreground pixels when background motion is detected by the long-term background model. In some examples, a pixel or unit of pixels can be considered as foreground pixels when background motion is detected by both the long-term background model and a short-term temporary picture. The short-term temporary picture can include the reference picture of the short-term background model (e.g., a previous frame before a current frame). As used herein, background motion refers to a change in a value of a pixel or unit outside of a range when an input frame is compared with the long-term and/or short-term models.

In some examples, when a pixel or unit of pixels is considered a foreground pixel or unit (e.g., background motion is detected for the pixel or unit of pixels using the long-term model) a number of times greater than a threshold for a certain period of time (indicating that the foreground pixel or unit has been present for an extended period of time), the long-term background model can be updated to take that pixel or unit location into account as background. In some cases, the short-term reference model can also be considered when determining whether to update the long-term background model. For example, another condition for updating the long-term background model can include that there is no background motion detected for the pixel or unit by the short-term background model (e.g., when comparing a difference in pixel values from consecutive pictures). The long-term background model can be updated using one of the models of the two or more statistical models of the foreground model. For example, the model from the two or more statistical models can replace the current long-term background model.

According to at least one example, a method of generating a background picture for coding one or more pictures is provided that includes generating a long-term background model for one or more pixels of a background picture, the long-term background model including a statistical model for detecting long-term motion of the one or more pixels in a sequence of pictures. The method further includes generating a short-term background model for the one or more pixels of the background picture, the short-term background model detecting short-term motion of the one or more pixels between two or more pictures. The method further includes determining a value for the one or more pixels of the background picture using the long-term background model and the short-term background model, wherein the background picture is used for coding the one or more pictures.

In another example, an apparatus for generating a background picture for coding one or more pictures is provided that includes a memory configured to store video data and a processor. The processor is configured to and can generate a long-term background model for one or more pixels of a background picture, the long-term background model including a statistical model for detecting long-term motion of the one or more pixels in a sequence of pictures. The processor is further configured to and can generate a short-term background model for the one or more pixels of the background picture, the short-term background model detecting short-term motion of the one or more pixels between two or more pictures. The processor is further configured to and can determine a value for the one or more pixels of the background picture using the long-term background model and the short-term background model, wherein the background picture is used for coding the one or more pictures.

In another example, a computer readable medium is provided having stored thereon instructions that when executed by a processor perform a method that includes: generating a long-term background model for one or more pixels of a background picture, the long-term background model including a statistical model for detecting long-term motion of the one or more pixels in a sequence of pictures; generating a short-term background model for the one or more pixels of the background picture, the short-term background model detecting short-term motion of the one or more pixels between two or more pictures; and determining a value for the one or more pixels of the background picture using the long-term background model and the short-term background model, wherein the background picture is used for coding the one or more pictures.

In another example, an apparatus is provided that includes means for generating a long-term background model for one or more pixels of a background picture, the long-term background model including a statistical model for detecting long-term motion of the one or more pixels in a sequence of pictures. The apparatus further includes means for generating a short-term background model for the one or more pixels of the background picture, the short-term background model detecting short-term motion of the one or more pixels between two or more pictures. The apparatus further includes means for determining a value for the one or more pixels of the background picture using the long-term background model and the short-term background model, wherein the background picture is used for coding the one or more pictures.

In some aspects, determining the value for the one or more pixels of the background picture includes updating the value when the long-term background model and the short-term background model indicate no foreground object motion of the one or more pixels in a picture. In some aspects, the method, apparatuses, and computer readable medium further include: receiving the picture, the picture including a pixel location corresponding to the one or more pixels; determining, using the long-term background model, a long-term change in intensity of at least one pixel in the pixel location, wherein the determined long-term change includes an intensity change within a long-term range; determining, using the short-term background model, a short-term change in intensity of the at least one pixel in the pixel location, wherein the determined short-term change includes an intensity change within a short-term range; and updating the value for the one or more pixels to a value of the at least one pixel when the long-term change in intensity is within the long-term range and when the short-term change in intensity is within the short-term range.

In some aspects, the long-term background model and the short-term background model are generated to represent a single pixel. In some aspects, the long-term background model and the short-term background model are generated to represent a plurality of pixels of a picture.

In some aspects, the value for the one or more pixels of the background picture includes a pixel intensity value.

In some aspects, the method, apparatuses, and computer readable medium further include: generating a foreground model, wherein the foreground model includes a mixture of statistical models representing one or more pixels of the sequence of pictures; determining long-term motion of the one or more pixels of the sequence of pictures using the long-term background model; determining a static state of the one or more pixels of the sequence of pictures using the short-term background model; and updating the long-term background model using a statistical model of the foreground model.

In some aspects, the background picture is used for coding at least one random access picture.

In some aspects, the method, apparatuses, and computer readable medium further include providing the background picture to a video encoder.

In some aspects, the method, apparatuses, and computer readable medium further include detecting an expiration of a period of time and providing the background picture to the video encoder upon detecting expiration of the period of time.

In some aspects, the method, apparatuses, and computer readable medium further include receiving a request for the background picture from the video encoder and providing the background picture to the video encoder upon receiving the request for the background picture.

In some aspects, the method, apparatuses, and computer readable medium further include predicting at least the portion of a random access picture using the background picture as a reference picture.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 7 is an example of pictures of an encoded video bitstream including background pictures and predictive random access pictures, in accordance with some embodiments FIG. 8 is a flowchart illustrating an embodiment of a process of generating a background picture, in accordance with some embodiments.

DETAILED DESCRIPTION

Figure 1:
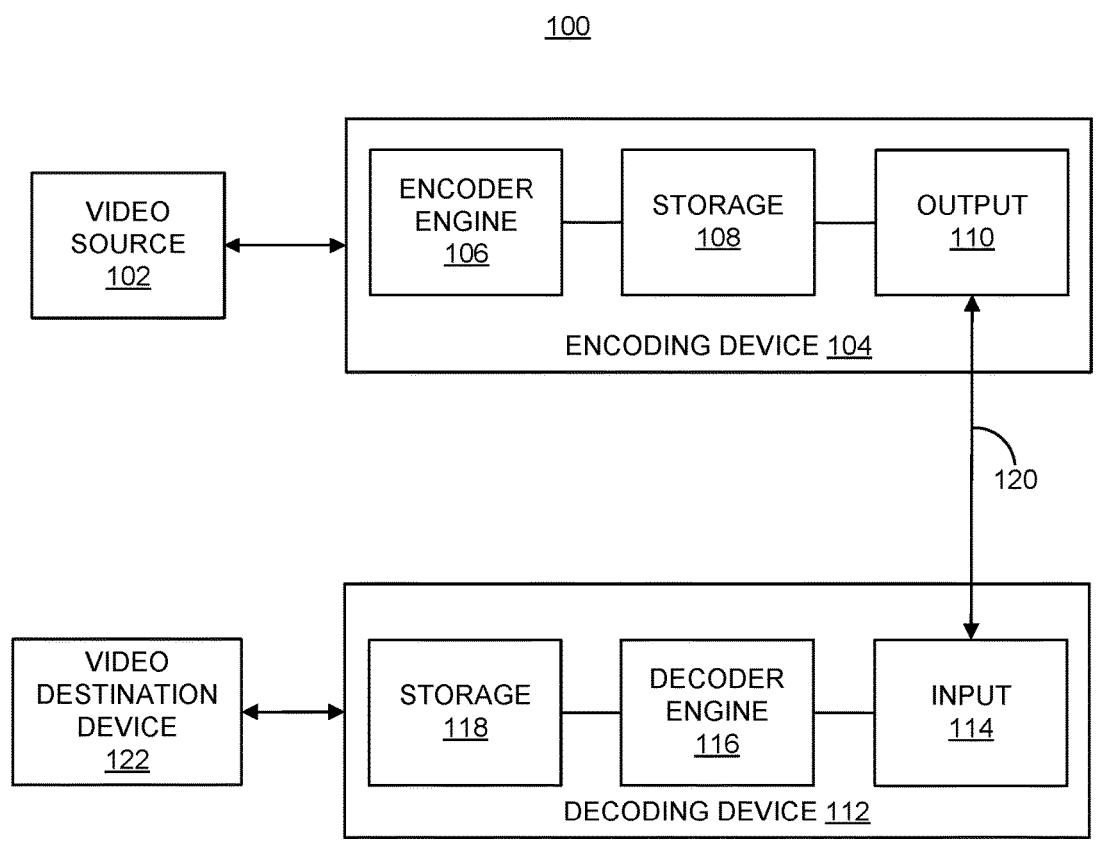
FIG. 1 is a block diagram illustrating an example of an encoding device and a decoding device, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

Several systems and methods of providing information for use in video coding using video encoders, decoders, and other coding processing devices are described herein. In some examples, one or more systems and methods of reference background picture generation are described. For example, video analytics can be used to provide intelligence for a coding system, including generating a background picture that can be used as a reference picture for coding one or more pictures. In some examples, the background picture generation systems and methods described herein can apply to an Internet Protocol (IP) camera or network of cameras, or other type of camera that is fixed in place without motion. One of ordinary skill in the art will appreciate that the background generation systems and methods can apply to other types of cameras that may not be fixed in place. In some examples, systems and methods are also described for updating a background model when the background of a picture or sequence of pictures changes. Detailed embodiments of the background generation and background model update systems and methods are described further below.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Many embodiments described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

A video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source. One example of a video source 102 can include an Internet protocol camera (IP camera). An IP camera is a type of digital video camera that can be used for surveillance, home security, or other suitable application. Unlike analog closed circuit television (CCTV) cameras, an IP camera can send and receive data via a computer network and the Internet.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signaled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level. In some examples, the one or more slices of a picture are assigned a slice type. Slice types include an I slice, a P slice, and a B slice. An I slice (intra-frames, independently decodable) is a slice of a picture that is only coded by Intra prediction, and therefore is independently decodable since the I slice requires only the data within the frame to predict any block of the slice. A P slice (uni-directional predicted frames) is a slice of a picture that may be coded with intra-prediction and uni-directional inter-prediction. Each block within a P slice is either coded with Intra prediction or inter-prediction. When the inter-prediction applies, the block is only predicted by one reference picture, and therefore reference samples are only from one reference region of one frame. A B slice (bi-directional predictive frames) is a slice of a picture that may be coded with intra-prediction and inter-prediction. A block of a B slice may be bi-directional predicted from two reference pictures, where each picture contributes one reference region and sample sets of the two reference regions are weighted (e.g., with equal weights) to produce the prediction signal of the bi-directional predicted block. As explained above, slices of one picture are independently coded. In some cases, a picture can be coded as just one slice.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoding device 104 may then perform transformation and quantization. For example, following prediction, the encoder engine 106 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

Supplemental Enhancement information (SEI) messages can be included in video bitstreams. For example, SEI messages may be used to carry information (e.g., metadata) that is not essential in order to decode the bitstream by the decoding device 112. This information is useful in improving the display or processing of the decoded output (e.g. such information could be used by decoder-side entities to improve the viewability of the content).

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard. In general, a layer includes a set of VCL NAL units and a corresponding set of non-VCL NAL units. The NAL units are assigned a particular layer ID value. Layers can be hierarchical in the sense that a layer may depend on a lower layer.

As previously described, an HEVC bitstream includes a group of NAL units, including VCL NAL units and non-VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

VCL NAL units include coded picture data forming the coded video bitstream. Various types of VCL NAL units are defined in the HEVC standard, as illustrated in Table A below. In a single-layer bitstream, as defined in the first HEVC standard, VCL NAL units contained in an AU have the same NAL unit type value, with the NAL unit type value defining the type of AU and the type of coded picture within the AU. For example, VCL NAL units of a particular AU may include instantaneous decoding refresh (IDR) NAL units (value 19), making the AU an IDR AU and the coded picture of the AU an IDR picture. The given type of a VCL NAL unit is related to the picture, or portion thereof, contained in the VCL NAL unit (e.g., a slice or slice segment of a picture in a VCL NAL unit). Three classes of pictures are defined in the HEVC standard, including leading pictures, trailing pictures, and intra random access (IRAP) pictures (also referred to as "random access pictures"). In a multi-layer bitstream, VCL NAL units of a picture within an AU have the same NAL unit type value and the same type of coded picture. For example, the picture that contains VCL NAL units of type IDR is said to be an IDR picture in the AU. In another example, when an AU contains a picture that is an TRAP picture at the base layer (the layer ID equal to 0), the AU is an TRAP AU.

Figure 2:
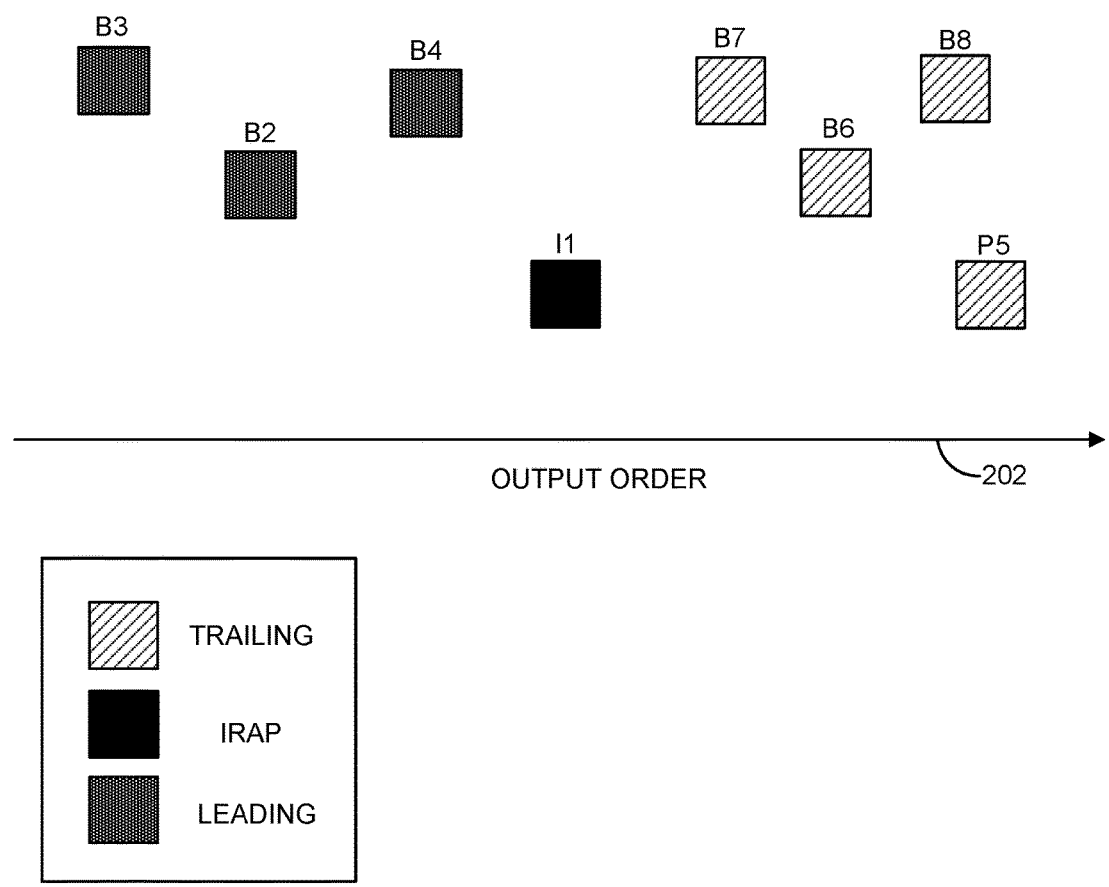
FIG. 2 is an example of pictures of an encoded video bitstream, in accordance with some embodiments.

FIG. 2 is an example of pictures of an encoded video bitstream including an TRAP picture I1 and leading and trailing pictures associated with the TRAP picture I1. The pictures are linearly displayed in output order in the direction of the arrow 202, and the numbers 1-8 (I1, B2, B3, B4, P5, B6, B7, B8) indicate the decoding order of the pictures. TRAP pictures provide points in a bitstream where decoding can begin. For example, decoding can begin at an TRAP picture so that pictures following the TRAP picture in output order, inclusive, can be output even if all pictures that precede the IRAP picture in decoding order are discarded from the bitstream (e.g., due to bitstream splicing, or the like). Because it is possible to start decoding at an TRAP picture, an IRAP picture not dependent on any other picture in the bitstream. For example, IRAP pictures belong to temporal sub-layer 0 and are coded without using content of any other pictures as reference data (e.g., intra-prediction coding is used). The first picture of a bitstream is an TRAP picture, and other TRAP pictures may also be present in the bitstream. In a multi-layer bitstream, IRAP pictures that have a layer ID greater than 0 (layers other than a base layer) may use inter-layer prediction. For example, the TRAP pictures may use inter-layer prediction based on pictures that belong to the same access unit and have lower layer ID. As described below, a new predictive random access picture is described that can be coded using inter-prediction with a background picture as a reference picture.

Pictures B2, B3, and B4 include leading pictures of the TRAP picture I1. A leading picture is a picture that follows an TRAP picture in decoding order, but precedes the TRAP picture in output order. As illustrated in FIG. 2, leading pictures B2, B3, and B4 are after TRAP picture I1 in decoding order, and come before the IRAP picture I1 in output order. In some embodiments, leading pictures use one of the leading picture NAL Unit types 6-9 shown in Table A above.

Pictures P5, B6, B7, and B8 include trailing pictures of the IRAP picture I1. A trailing picture is a picture that follows an TRAP picture in decoding order and in output order. As illustrated in FIG. 2, trailing pictures P5, B6, B7, and B8 follow the IRAP picture I1 in decoding order and also in output order. Trailing pictures use one of the trailing picture NAL Unit types 0-5 shown in Table A above.

Leading pictures and trailing pictures are associated with the closest IRAP picture in decoding order (picture I1 in FIG. 2). In some embodiments, the decoding order of an IRAP picture and its associated trailing and leading pictures is defined based on certain conditions of leading and trailing pictures. For example, trailing pictures depend on an associated IRAP picture and other trailing pictures of the same IRAP picture. Trailing pictures associated with an IRAP picture do not depend on any leading pictures, and also do not depend on any trailing pictures of previous IRAP pictures. Leading pictures associated with an IRAP picture precede trailing pictures (in decoding order) that are associated with the same IRAP picture. Based on these conditions, and similar other conditions that are not listed here, the decoding order of the IRAP picture I1 and its associated trailing and leading pictures is the IRAP picture I1, followed by the trailing pictures B2, B3, B4, followed by the leading pictures P5, B6, B7, B8.

Various types of trailing pictures, leading pictures, and IRAP pictures are available. For example, trailing pictures include temporal sub-layer access (TSA) pictures, step-wise temporal sub-layer access (STSA) pictures, and ordinary trailing pictures (TRAIL). A TSA picture indicates a temporal sub-layer switching point at which switching can occur up to any higher sub-layer. A STSA picture indicates a temporal sub-layer switching point at which switching can occur to the sub-layer with the same temporal layer identifier as the STSA picture. TSA and STSA pictures belong to temporal sub-layers with temporal identifiers greater than 0. A TRAIL picture can belong to any temporal sub-layer, and does not indicate a temporal sub-layer switching point. In multi-layer bitstreams, STSA pictures that belong to the layer with layer ID greater than 0 can also belong to the temporal sub-layer with temporal sub-layer equal to 0.

Leading picture types include random access decodable leading (RADL) pictures and random access skipped leading (RASL) pictures. A RADL picture is a leading picture that is decodable when random access is performed at the IRAP picture with which the RADL picture is associated. In some embodiments, RADL pictures reference, for prediction purposes, only the associated IRAP picture and other RADL pictures that are also associated with the TRAP picture. A RASL picture is a leading picture that may not be decodable when random access is performed from an associated IRAP picture. A RASL picture is not decodable when a picture that the RASL picture uses for reference precedes the IRAP picture in decoding order. The RASL picture is not decodable because a decoder performing random access at the TRAP picture will not decode the picture that precedes the IRAP picture in decoding order, and thus will also not decode the RASL picture. RASL pictures can reference other types of pictures (e.g., TRAP pictures, other RASL pictures, RADL pictures, or the like). In some examples, only RASL pictures can be dependent on other RASL pictures, in which case every picture that depends on a RASL picture is a RASL picture.

Random access is an important feature for video codecs. For example, random access is used for video streaming, video broadcasting, multi-party video telephony, and many other applications, to tune-in to a sequence of video. Based on the random access points (e.g., an TRAP picture), video editing or analysis can be made easier, for example, in terms of number of pictures to be decoded to reach to a specific frame of interest. Different types of random access pictures are used for coding video data and allowing random access, including Instantaneous Decoding Refresh (IDR) pictures, Clean Random Access (CRA) pictures, and Broken Link Access (BLA) pictures. In H.264/AVC, the random access pictures are coded as DR pictures. An DR picture is an intra-picture (I-picture) that completely refreshes or reinitializes the decoding process at the decoder and starts a new CVS. For example, an IDR picture is not only coded as an I picture, but also breaks the temporal prediction in the decoding order. An IDR picture and any picture following the IDR picture in decoding order cannot be dependent on any picture that comes before the IDR picture in decoding order. Accordingly, pictures following an IDR picture in decoding order cannot use pictures decoded prior to the IDR picture as reference. In some cases, RASL pictures are not allowed to be associated with an IDR picture.

Figure 3:
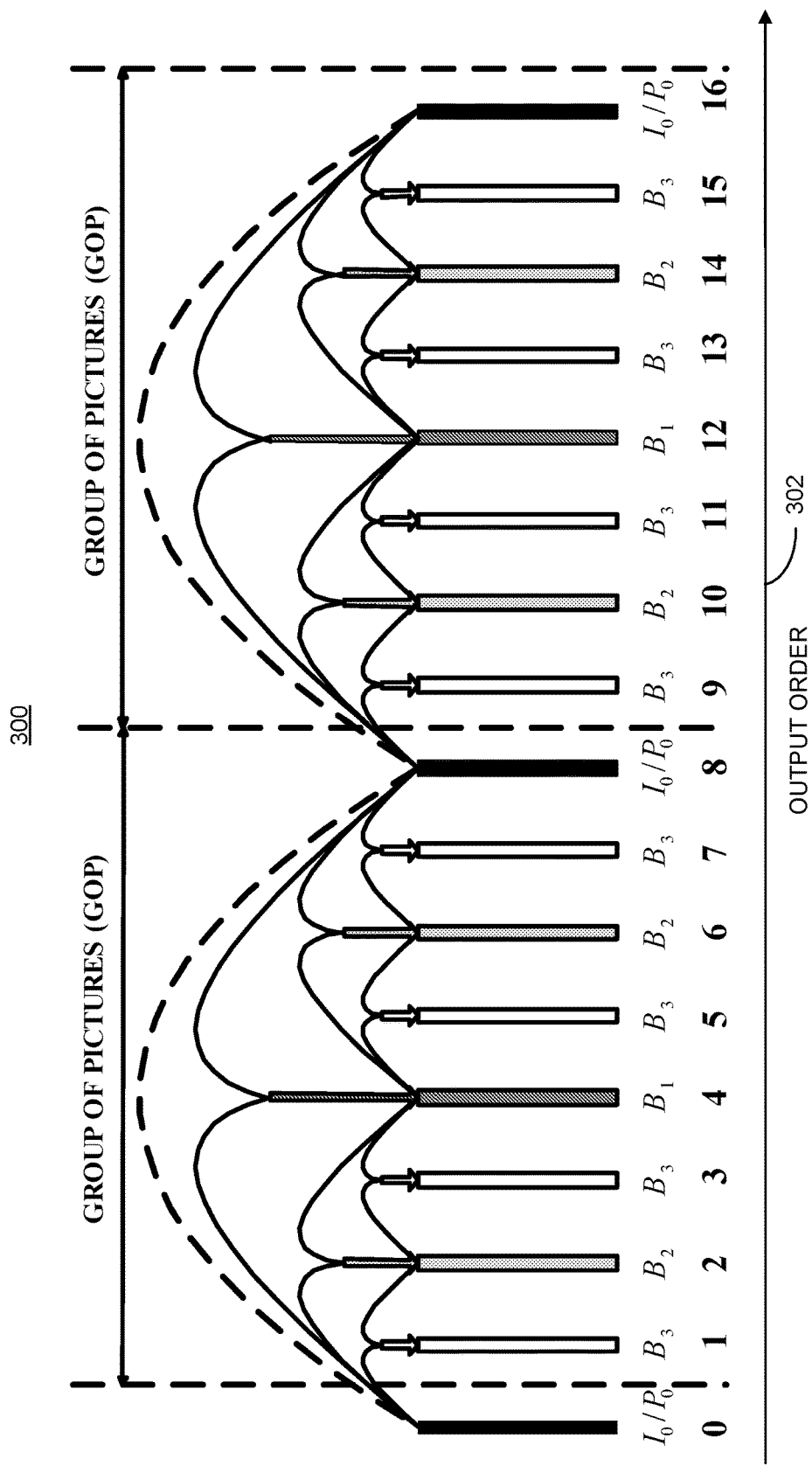
FIG. 3 is another example of pictures of an encoded video bitstream, in accordance with some embodiments.

FIG. 3 is an example of pictures of an encoded video bitstream including IDR pictures. The bitstream includes hierarchical B picture coding with four temporal levels and a group of picture (GOP) size of 8. The pictures are linearly displayed in output order in the direction of the arrow 302. As shown in FIG. 3, the first Intra coded picture ($I_0$) is an IDR picture. Note that, due to the prediction structure, display order and decoding order of the pictures in a coded video sequence may not be the same. Pictures belonging to a certain prediction structure may be referred to as a Group of pictures (GOP).

In HEVC, more types of random access pictures are defined in addition to IDR pictures. For example, to improve coding efficiency, CRA pictures in HEVC allows pictures that follow the CRA picture in decoding order but precede the CRA picture in output order to use pictures decoded before the CRA picture as reference, while still allowing similar clean random access functionality as an IDR picture. As shown in FIG. 3, if the picture in display order 16 is coded as I picture, it is actually a CRA picture. Clean random access is ensured by guaranteeing that pictures that follow a CRA picture in both decoding and output order (also referred to as "display order") are decodable if random access is performed at the CRA picture. In some aspects, a CRA picture is an I-picture. A CRA picture does not refresh the decoder and does not begin a new CVS, allowing leading pictures of the CRA picture to depend on pictures that come before the CRA picture in decoding order. In some examples, a CRA picture may have associated RADL pictures and RASL pictures. Random access may be done at a CRA picture by decoding the CRA picture, leading pictures associated with the CRA picture that are not dependent on any picture coming before the CRA picture in decoding order, and all associated pictures that follow the CRA in both decoding and output order. In some cases, a CRA picture may not have associated leading pictures. In the multi-layer case, an IDR or a CRA picture that belongs to a layer with layer ID greater than 0 may be a P-picture or a B-picture, but these pictures can only use inter-layer prediction from other pictures that belong to the same access unit as the IDR or CRA picture, and that have a layer ID less than the layer containing the IDR or CRA picture. In some cases, in HEVC, a conforming bitstream may contain no IDR pictures at all.

IRAP pictures provide the ability to splice bitstreams together. For example, an encoder, a bitstream editor (or "editor"), a splicer, or other network device may splice bitstreams together using an IRAP picture. Bitstream splicing allows seamless switching from one compressed video bitstream to another compressed video bitstream. For example, splicing occurs by replacing a first TRAP AU and all subsequent AUs of a first compressed bitstream with a second IRAP AU and subsequent AUs of a second compressed bitstream. CRA pictures can be used for splicing compressed video bitstreams (in addition to random access, as previously described). For example, the first and second IRAP AUs may include CRA pictures. In some embodiments, IDR pictures can be used for splicing compressed video bitstreams. In some cases, it is not necessary that the first AU should contain an TRAP picture. In multi-layer bitstreams, splicing can occur when the second AU contains an TRAP picture that belongs to base layer.

In some cases, after splicing occurs, a RASL picture that follows a CRA picture in decoding order may not be decodable in the event the RASL picture references one or more pictures that are no longer in the bitstream after splicing. In some examples, an encoder, editor, splicer, or other device may discard the RASL pictures during splicing. In other examples, a broken link splicing option may be used to indicate that a picture order count timeline, as well as prediction from pictures preceding the CRA picture (in decoding order) that RASL pictures may depend on, are broken when splicing is done.

A third type of TRAP picture, called a Broken link access (BLA) picture, is similar to CRA in terms of the status of pictures following the BLA picture in decoding order but prior to the BLA picture in output order. A BLA picture can be used to signal that bitstream splicing has been done. For example, a BLA picture can be used to inform a decoder when a splicing operation has occurred so that the decoder can determine whether associated RASL pictures should be decoded. During splicing, the CRA picture in the new bitstream that is used for splicing is treated as a BLA picture. When broken link splicing is performed, RASL pictures may be kept, and a decoder that comes across such a BLA picture may discard the RASL pictures associated with the BLA picture. In the event the decoder encounters a CRA picture, the decoder will decode RASL pictures associated with the CRA picture. When a decoder comes across a BLA picture or a CRA picture, the decoder will decode all RADL pictures associated with the BLA and CRA pictures, respectively. A BLA picture refreshes or reinitializes the decoding process at the decoder and starts a new CVS. In some embodiments, a BLA picture may be used even when splicing has not occurred.

Decoded pictures may be stored in a buffer (e.g., a decoded picture buffer (DPB)) and used for prediction of the later decoded pictures (pictures later in decoding order). The pictures used for prediction of later decoded pictures may be referred to as reference pictures. Since the buffer size is typically limited, management of those pictures is needed. A Picture Order Count (POC) is a value that uniquely identifies a picture. Every picture has a POC value assigned to it. The POC value has multiple uses, including to uniquely identify the pictures, to indicate the output position of a picture relative to other pictures in a same coded video sequence (CVS), and to perform motion vector scaling within the VCL decoding process. One or multiple ways of signaling the POC may be used. For example, the value of the picture order count (POC), represented by PicOrderCntVal, for a particular coded picture denotes the picture's relative order in the picture output process with respect to other pictures in the same CVS. At least a portion of the POC value of a picture can be signaled in a slice header. For example, the POC value can comprise of the least significant bits (LSB) and the most significant bits (MSB), and the POC value can be obtained by concatenating the MSB on its right by the LSB. In some examples, the number of bits to use for the LSB can be between 4 and 16 (e.g., as signaled in a parameter set), but can include any suitable number in other examples. In some examples, the LSB can be signaled in the slice header. In such examples, since only the LSB are signaled to the decoder, the MSB can be derived by the decoder based on a previous picture, referred to herein as a POC-anchor picture, which can be chosen using any suitable, known technique. In one illustrative example, the POC-anchor picture can be chosen as the closest previous picture of temporal layer 0 that is not a RASL picture, a RADL picture, or a sub-layer non-reference picture. The decoder can derive the POC MSB value by comparing the POC of the current picture to the POC value of the POC-anchor picture.

In H.264/AVC, the reference picture marking is summarized as follows. The maximum number, referred to as M (num_ref_frames), of reference pictures used for inter-prediction is indicated in the active sequence parameter set (SPS). When a reference picture is decoded, it is marked as "used for reference." If the decoding of the reference picture caused more than M pictures marked as "used for reference," at least one picture must be marked as "unused for reference." The DPB removal process then would remove pictures marked as "unused for reference" from the DPB if they are not needed for output as well.

When a picture is decoded, it is either a non-reference picture or a reference picture. A reference picture can be a long-term reference picture or short-term reference picture, and when a reference picture is marked as "unused for reference," it becomes a non-reference picture. In AVC, there are reference picture marking operations that change the status of the reference pictures. For example, there are two types of operation modes for the reference picture marking: sliding window and adaptive memory management control operation (MMCO). The operation mode for reference picture marking is selected on a picture basis. The sliding window operation works as a first-in-first-out queue with a fixed number of short-term reference pictures. For example, short-term reference pictures with earliest decoding time is firstly to be removed (marked as a picture "unused for reference"), in an implicit fashion. The adaptive memory control removes short-term or long-term pictures explicitly. Adaptive memory control also enables switching the status of the short-term and long-term pictures.

In H.265/HEVC, a new approach is introduced for reference picture management, referred to as an RPS or buffer description. A fundamental difference with the RPS concept compared to MMCO and sliding window operation modes of H.264/AVC is that, for each slice, a complete set of the reference pictures that are used by the current picture or any subsequent picture must be provided. Accordingly, a complete set of all pictures that must be kept in the DPB for use by the current or future picture is signaled. This is different from the H.264/AVC scheme where only relative changes to the DPB are signaled. With the RPS concept, no information from earlier pictures in decoding order is needed to maintain the correct status of reference pictures in the DPB. The RPS contains multiple RPS subsets. The subset RefPicSetStCurrBefore includes all short-term reference pictures that are prior to the current picture in both decoding order and output order, and that may be used in inter-prediction of the current picture. The subset RefPicSetStCurrAfter includes all short-term reference pictures that are prior to the current picture in decoding order, that succeed the current picture in output order, and that may be used in inter-prediction of the current picture. The subset RefPicSetStFoll includes all short-term reference pictures that may be used in inter-prediction of one or more of the pictures following the current picture in decoding order, and that are not used in inter-prediction of the current picture. The subset RefPicSetLtCurr includes all long-term reference pictures that may be used in inter-prediction of the current picture. The subset RefPicSetLtFoll includes all long-term reference pictures that may be used in inter-prediction of one or more of the pictures following the current picture in decoding order, and that are not used in inter-prediction of the current picture.

As previously described, a capture device (e.g., video source 102) can include an Internet protocol camera (IP camera). An IP camera is a type of digital video camera that can be used for surveillance, home security, or other suitable application. An IP camera can be used to send and receive data via a computer network and the Internet. IP camera systems can be used for two-way communications. For example, data (e.g., audio, video, metadata, or the like) can be transmitted using one or more network cables or using a wireless network, allowing users to communicate with what they are seeing (e.g., a gas station clerk assisting a customer on how to use a pay pumps). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For example, IP cameras offer secure data transmission through already defined encryption and authentication methods for IP based applications. Labor cost efficiency is increased with IP cameras. For example, video analytics can produce alarms for certain events, which reduces the labor cost in monitoring all the cameras (based on the alarms) in a system.

Video Analytics, also referred to as Video Content Analysis (VCA), is a generic term used to describe computerized processing and analysis of the video sequence acquired by a camera (e.g., an IP camera or other suitable capture device). Video Analytics provides a variety of tasks ranging from immediate detection of events of interest, to analysis of pre-recorded video for the purpose of extracting events in a long period of time. Various research studies and real-life experiences indicate that in a surveillance system, for example, a human operator typically cannot remain alert and attentive for more than 20 minutes, even for monitoring the pictures from one camera. When there are two or more cameras to monitor or as time goes beyond a certain period of time (e.g., 20 minutes), the operator's ability to monitor the video and effectively respond to events is significantly compromised. Video Analytics is introduced to automatically analyze the video sequences from the cameras and send alarms for events of interest. This way, the human operator can monitor one or more scenes in a passive mode. Furthermore, Video Analytics can analyze a huge volume of recorded video and can extract specific video segments containing an event of interest.

Video Analytics provides various other features. For example, Video Analytics can operate as an Intelligent Video Motion Detector by detect moving objects and by tracking moving objects. The Video Analytics can display a bounding box around the valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like). The Video Analytics can be trained to recognize certain objects. Another function that can be performed by Video Analytics includes providing demographics for customer metrics (e.g., customer counts, gender, age, amount of time spent, and other suitable metrics). Video Analytics can also perform video search (e.g., extracting basic activity for a given region) and video summary (e.g., extraction of the key movements). Event detection can be performed by Video Analytics, including detection of fire, smoke, fighting, crowd formation, or any other suitable even the Video Analytics is programmed to detect. A detector typically triggers the detection of event of interest and sends alarm to a central control room to alert a user of the event of interest.

Video Analytics can also perform background extraction (also referred to as "background subtraction") from video. Background extraction can be used to segment moving objects (called foreground objects) from the global background in a video sequence. Various methods exist for background extraction in video. For example, a background extraction method can model the background of the scene as a statistical model based on the relatively static pixels in previous frames which are not considered to belong to any moving region. Examples of statistical models include a Gaussian distribution model, a mixture of Gaussians (GMM), and other suitable statistical models. Background extraction techniques are based on the assumption that the camera is mounted still, and if anytime the camera is moved or orientation of the camera is changed, a new background model will need to be calculated. There are also background extraction methods that can handle foreground subtraction based on a moving background, including techniques such as tracking key points, optical flow, saliency, and other motion estimation based approaches.

Once a background model is generated, there are several ways to generate a background picture. In one video analytics solution, a background picture may be synthesized using the values of a Gaussian model, regardless of whether the current pixel belongs to a background pixel or foreground pixel. A similar concept applies to other modeling methods (e.g., Gaussian mixture model), wherein a pixel value of a synthesis background picture will be the expectation of the model (e.g., the Gaussian mixture model), without taking into account whether the current pixel belongs to a background pixel or foreground pixel.

In order to compress video efficiently, a good reference picture to use for the compression is important. How to select or generate such a reference picture is critical to providing efficient video compression. Techniques are described herein for utilizing a background picture as a reference picture for video coding. An insufficient background picture may provide much less coding efficiency in video coding, and may be produced in various cases. For example, when there is a large amount of motion in the field of view of the capture device, the background picture may contain some noise or even foreground objects due to the fact that the foreground objects are occurring frequently (causing the large amount of motion). In another example, a GMM type of modeling technique is an effective way to model the background of the field of view for background extraction. GMM techniques may be advanced in terms of adapting in real-time to the emerging objects of each pixel or region of a picture. However, a GMM does not perform well for generating a background picture used by a video encoder in coding video. For example, the learning process for GMM is slow in terms of identifying the intensity values of the background regions. Another reason is that multiple Gaussian models will blend the background picture when motion is active in the scene. For example, a GMM may blend foreground pixels as background pixels if the area includes motion for a period of time and the weight of the Gaussian model representing the foreground pixel is high enough. In this situation, part of the foreground will be considered as background (foreground pixels may be updated into the background picture), making the background picture insufficient for use in encoding video pictures.

Systems and methods are described herein for providing information for use in video coding by video encoders, decoders, and other coding processing devices. In some examples, one or more systems and methods of reference background picture generation are described for providing information that can be used to efficiently encode captured video and decode the encoded video. For example, video analytics can be used to generate a background picture that can be used as a reference picture for coding one or more pictures. In one example, a sequence of images captured by an image capture device may share a common background, and video analytics can perform background extraction to extract the background region of one or more of the images. In some examples, the background picture generation systems and methods described herein can apply to an Internet Protocol (IP) camera or network of cameras, or other type of camera that is fixed in place without motion. One of ordinary skill in the art will appreciate that the background generation systems and methods can apply to other types of cameras that may not be fixed in place. In any given embodiment, the various embodiments and aspects may be combined or be used separately as would be apparent to those of skill in the art.

Figure 4:
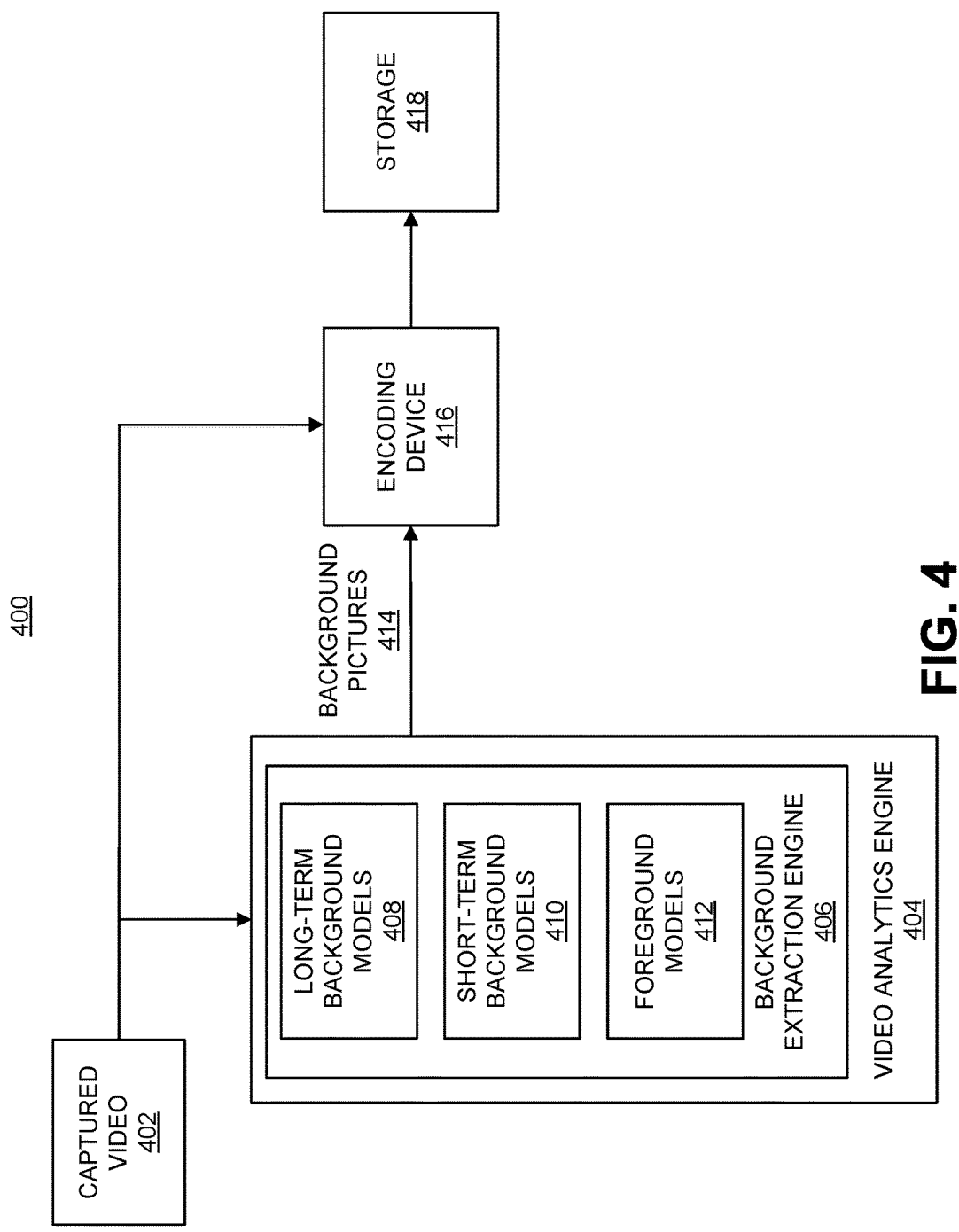
FIG. 4 is a block diagram illustrating an example of a coding system using intelligence from video analytics, in accordance with some embodiments.

FIG. 4 illustrates a system 400 including a video analytics engine 404 that can provide intelligence to a video encoding device 416. The video encoding device 416 utilizes the video analytics intelligence information for coding video. The system 400 includes the video analytics engine 404, the encoding device 416, and the storage device 418. Captured video 402 including a sequence of captured pictures (or "frames") is received and processed by the video analytics engine 404 and the encoding device 416. The video analytics engine 404 can generate a target background picture by generating and simultaneously maintaining one or more long-term background models and one or more short-term background models. For example, a background extraction engine 406 of the video analytics engine 404 can generate and simultaneously maintain long-term background models 408, short-term background models 410, and foreground models 412. The background extraction engine 406 can generate one or more background pictures 414 from the captured video pictures using the long-term background models 408, short-term background models 410, and foreground models 412. Input pictures (or frames) of the captured video 402 can be considered one by one in capture (or display) order, allowing the video analytics engine 404 to adapt and change according to the received pictures. One of ordinary skill will appreciate that the video analytics engine 404 can consider more than one picture at a time. In some examples, each pixel location has a corresponding long-term background model, short-term background model, and foreground model, as described with respect to FIG. 5. In other examples, a long-term background model, a short-term background model, and a foreground model can be maintained for a unit of pixel locations, as described with respect to FIG. 6.

A long-term background model can be used to detect long-term background motion of one or more pixel locations (and the corresponding pixels) across a sequence of the pictures of the captured video 402. For example, the long-term background model can detect a history of long-term background motion for a pixel location or a unit of pixel locations. Long-term background motion refers to a change in a pixel (or unit) value by a certain amount for a corresponding pixel (or unit) location when a current input frame is compared to the long-term background model for the pixel (or unit) location. A pixel value can refer to a pixel intensity or other representative value for a pixel. Pixel intensity can include color values of a pixel (e.g., luma and chroma (YCbCr) values, red-gree-blue (RGB) values, or other color space values), brightness of the pixel, or a combination thereof. The change in pixel (or unit) value can be based on a range, a threshold, or other suitable measure of change. In some examples, when background motion is detected for a pixel (or unit), the pixel (or unit) and the corresponding location can be considered a foreground pixel.

In some embodiments, a long-term background model for a pixel or for unit of pixels includes a single statistical model. In one example, the single statistical model can include a Gaussian model. One of ordinary skill in the art will appreciate that other suitable statistical models that can model the characteristics of a pixel can be used. The Gaussian model includes parameters of mean, standard deviation, and variance to model each pixel location (or unit of pixel locations) in a video sequence. The mean represents the average intensity of a pixel location, the standard deviation is the deviation of pixel values from the mean for the pixel location, and the variance is the average of the squared differences of pixel intensity values from the mean. The values of previous pixels at a particular pixel location are used to calculate the mean, standard deviation, and variance of a target Gaussian model for the pixel location. The long-term background model can be updated by taking into consideration pixel values of a current input picture. For example, the mean, standard deviation, and variance of the Gaussian model for a pixel location are updated using a current pixel value of the input picture.

When a new video picture is processed, the value of a pixel at a given location in the picture can be evaluated by the Gaussian distribution of the Gaussian model associated with the pixel location. The video analytics engine 404 can classify the pixel (and the pixel location) as either a foreground pixel or a background pixel by determining an amount of change in the pixel value. The amount of change can be determined by comparing the pixel value to the mean of the Gaussian model designated to that pixel location. In the event the change is small enough to indicate that the pixel is a background pixel, the pixel can be classified as a background pixel. For example, if the difference of the pixel value for a pixel (or unit) location from the current mean value in the Gaussian for that pixel (or unit) location is smaller than a certain threshold, the pixel or unit (and the corresponding location) is considered a background pixel (or unit). Similarly, if the pixel value and mean value are different enough (e.g., larger than the threshold), indicating the pixel is not a background pixel, the pixel can be classified as a foreground pixel. In one example calculation, given a predefined scale factor $\alpha$ for the long-term background Gaussian model for a pixel location, only an intensity within a range of $[\mu-\alpha\sigma, \mu+\alpha\sigma]$ is considered background, where $\mu$ is the mean of the Gaussian and $\sigma$ is the standard deviation of the Gaussian. Intensities outside of the range are considered background motion. In these embodiments, the long-term background model is based on single Gaussian model with an automatic update mechanism (as described below). Using the long-term background model, the video analytics engine 404 decides whether the current pixel (or unit) of an input picture (or frame) belongs to background or foreground based on the pixel intensity.

In some examples, the change in a pixel value as compared to the mean of the Gaussian model for that pixel location can be determined based on the variance (the average of the squared differences from the mean). For example, if the distance of the pixel value and the Gaussian mean value for the pixel location is less than threshold distance from the variance (e.g., less than 3 times of the variance, less than 4 times of the variance, less than 5 times of the variance, or other suitable threshold distance), the pixel can be classified as a background pixel. Otherwise, the pixel can be classified as a foreground pixel.

The short-term background model can be used to detect short-term background motion of one or more pixel locations (and the corresponding pixels). In some examples, the short-term background model includes a frame comparison model that detects short-term background motion between a number of captured pictures, such as between a pair of consecutive pictures, or among several pictures. In one example, for the short-term background model, only the change in intensity $\Delta I$ within the range of $[0, T]$ is considered background, where $\Delta I=|I^{t}-I^{t-1}|$ is the absolute difference of the intensity of the pixel in the consecutive frame t−1 and frame t. In such an example, the short-term background is set to be the absolute difference of pixel pairs (or unit pairs) of consecutive frames. The term T is a threshold parameter that can be set to any suitable value. For example, the threshold T can be set to a value of 5, 10, 15, 20, 25, 30, or any other suitable threshold intensity value. In some examples, the short-term background model can contain color, in addition to intensity, as part of model.

The background extraction engine 406 can generate and update one or more background pictures 414 from the captured video pictures using the long-term background models 408 and the short-term background models 410. In some examples, a synthesis background picture can be generated from the long-term background model 408. For example, the pixel value of a synthesis background picture at time t will be the mean value of the Gaussian distribution (of the long-term background model 408) built and updated through at time t for a given pixel location. The long-term background model 408 and the short-term background model 410 can be used to subtly synthesize the background picture (e.g., by taking into consideration whether a current pixel belongs to a background pixel or foreground pixel). For example, when the pictures of the captured video 402 are first received, the target background picture can be set to be the first frame or picture of the captured video 402. Based on the long-term background models 408 and the short-term background models 410 (as described further below), if the background motion indicates the corresponding image block of the target background picture should be updated, the pixels of the current picture can be used to replace those in the target background picture. In an alternative embodiment, a moving average can be applied to update the target background picture by performing a weighted summing of the intensities of the pixels of the current frame and the target background picture.

In some embodiments, a target background picture is updated after each picture is processed, and is finalized when certain conditions are met. The target background picture can be updated in a stable manner to reduce the possibility of a background picture having or being updated with foreground pixels. For example, when considering a current input picture, a pixel (or unit) location of a target background picture will be updated only when both the long-term background model and short-term background model for the pixel (or unit) location detect a change within limited ranges (indicating no foreground object motion). The detected change can include a change in pixel intensity. For example, the pixel intensity of a pixel (or unit) of a target background picture is updated when neither the long-term model nor the short-term model indicates foreground object motion for the pixel or unit. The limited range for the long-term background model can include the range of $[\|-\alpha\sigma, \mu+\pi\sigma]$, as described above. The limited range for the short-term background model can include a change in intensity $\Delta I$ within the range of $[0, T]$, as described above.

In some examples, a current input frame can be available for use as a background picture. For example, instead of using a synthetic background picture, a reference background picture can include an actual captured frame when certain conditions are met. Such a background picture using an actual frame or picture can be referred to as a quick updated background picture. In one example, when short-term background motion (detected using the short-term background model) is sparse, an entire current background picture can be updated to include the current input frame. For example, short-term motion can be considered sparse when less than x % of the pixel or unit locations in a picture have background motion. The term x can be any suitable number, such as 0.05, 0.10, 0.15, or any other suitable percentage. When a background frame is updated to include a current input frame, the long-term background model for each pixel can be updated with a mean value set to the value of the current frame. In some embodiments, a synthetic picture and a quick updated background picture can both be available for output to the encoding device 416.

Because a single statistical model (e.g., a Gaussian model) is used as the long-term background model for a pixel (or unit) location, a mechanism to update the long-term background model is needed when the background of the captured video 402 is changed. In some embodiments, the long-term background models 408 can be updated using the foreground models 412. The foreground models 412 keep track of the changes in the scene. For example, a foreground model can be used only to maintain and model the foreground pixels detected in the captured video 402. For example, a pixel (or unit) can be considered as foreground when background motion is detected by the long-term background model. In another example, a pixel (or unit) can be considered as foreground when background motion is detected by both the long-term background model and the short-term temporary picture, which is the reference picture of the short-term background model (e.g., a previous frame before a current frame). In some examples, a foreground model can include a mixture of statistical models with two or more statistical models. One example of a mixture of statistical models includes a mixture of Gaussian models, referred to as a Gaussian mixture model (GMM). For instance, a foreground GMM model has K Gaussian models, wherein K is larger than or equal to two Gaussian models. The GMM can model each pixel as a mixture of Gaussians and can use an online learning algorithm to update the model. Each Gaussian model in the GMM is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t | \mu_{i,t}, \Sigma_{i,t}) \quad \text{Equation (1)}$$

An equation of the GMM model is shown in equation (1), wherein there are K Gaussian models. Each Gaussian model has a distribution with a mean of $\mu$ and variance of $\Sigma$, and has a weight $\omega$. In equation (1), i is the index to the Gaussian model and t is the time instance. As shown by equation (1), the parameters of the GMM change over time after one frame (at time t) is processed. One of ordinary skill in the art will appreciate that a GMM is one example of a foreground model, and that the foreground models 412 can include any suitable model that can model foreground pixels in a video sequence.

The foreground GMM model for a pixel (or unit) location can be updated using information from the long-term background model for the pixel (or unit) location. For example, when a long-term background model for a pixel (or unit) location considers a pixel (or unit) in that location as a foreground pixel (e.g., the pixel intensity is outside of the range described above), the foreground GMM can be updated to indicate the pixel location as part of the foreground. Another example can include updating the foreground GMM when background motion is detected for a pixel (or unit) by both the long-term background model and the short-term background model using the reference picture of the short-term background model (e.g., a previous frame before a current frame), indicating the pixel (or unit) is foreground.

As noted previously, a long-term background model for a pixel (or unit) location may be intelligently updated using a foreground model for the pixel (or unit) location. The long-term background model may be updated when the background of the captured video 402 is changed. In one illustrative example, the captured video 402 may include a scene of a parking lot. During a sequence of pictures, a truck may enter the scene and park in a parking spot. After a period of time or a number of pictures during which the truck stays substantially static (e.g., within a threshold or range) in the scene, the background model can be updated to include the truck. For example, when a pixel or unit making up at least a portion of the truck is considered a foreground pixel or unit (e.g., background motion is detected for the pixel or unit of pixels using the long-term model and/or the short-term model) for a number of times and/or for a certain period of time (indicating that the foreground pixel or unit has been present in the scene for an extended period of time), the long-term background model can be updated to take that pixel or unit location into account as background. The number of times may be a number of pictures in which the pixel is considered a foreground pixel (e.g., with similar intensity and/or color values), and may be set to any suitable number (e.g., 5 frames, 10 frames, 50 frames, 120 frames, or any other suitable number of pictures or frames). The period of time can be set to any suitable period of time (e.g., every 0.10 seconds, 0.25 seconds, every 0.5 seconds, every 1 second, every 2 seconds, or other period of time). Using the above example, when a number of occurrences of foreground pixels or units making up the truck is larger than a threshold within the period of time, the foreground pixels (and thus the truck) can be considered background pixels.

In some cases, a short-term background model for a pixel (or unit) location can also be considered when determining whether to update the long-term background model for the pixel (or unit) location. For example, another condition for updating the long-term background model using the foreground model can include that there is no background motion detected for the pixel (or unit) location by the short-term background model. The short-term background model, as described above, can compare a difference in pixel values (e.g., intensity and/or color) from consecutive pictures to detect background motion between the pictures. Taking the short-term background model of one or more pixel (or unit) locations into account, the background extraction engine 604 can update the long-term background model of the corresponding pixel (or unit) location when there is no background motion detected by the short-term background model (e.g., detected by the pixel intensity difference from that of the previously consecutive frame) and when the long-term background model detects a certain number of occurrences of background motion for the pixel (or unit) location. In some examples, the short-term background model can take into account a period of time. For example, if the short-term background model indicates no motion for a period of time (e.g., over three or more frames), the extraction engine 604 can consider the foreground as being stable for that period of time.

A long-term background model for a pixel (or unit) location can be updated using one of the models of the mixture of statistical models making up the foreground model for the pixel (or unit) location. For example, a Gaussian model from the mixture of Gaussian models can replace the current long-term background model for a pixel (or unit) location. In some examples, the most probable Gaussian model (e.g., the one with the largest weight) of a foreground GMM model is used to replace the long-term background model. In such examples, the foreground GMM model is updated by excluding the most probable Gaussian model that replaced the long-term background model.

Figure 5:
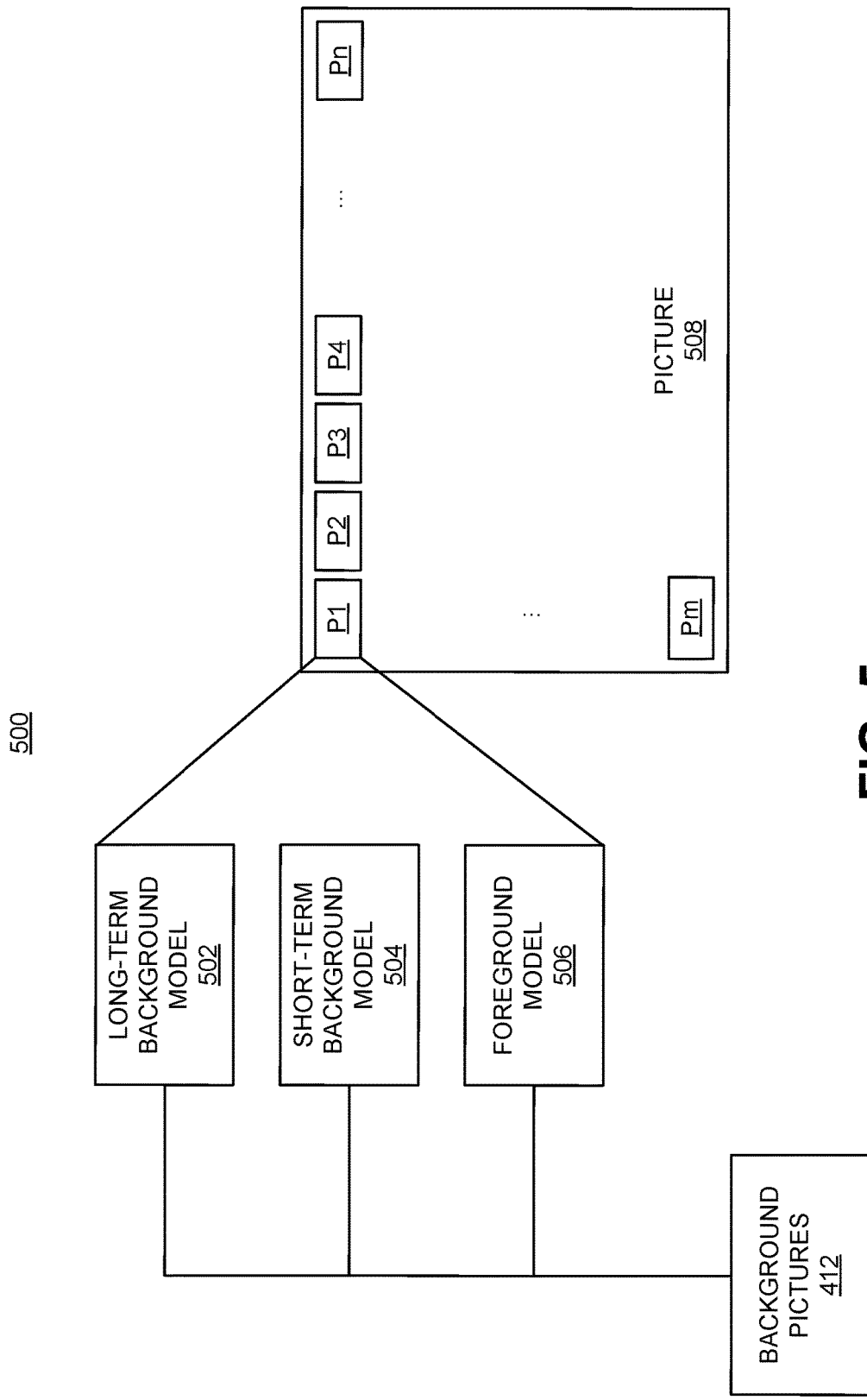
FIG. 5 is an example of a picture including a pixel location and associated models, in accordance with some embodiments.

As noted previously, in some embodiments, each pixel location is associated with or assigned a corresponding long-term background model, short-term background model, and foreground model. For example, as shown in FIG. 5, a separate long-term background model 502, short-term background model 504, and foreground model 506 can be maintained for a pixel location P1 in a picture 508. The picture 508 includes pixel locations P1, P2, P3, P4, through Pn and Pm, and can include one picture from the sequence of pictures of the captured video 402 shown in FIG. 4. The locations P1, P2, P3, P4, through Pn and Pm are also present in the other pictures of the sequence of pictures of the captured video 402. The pixel values in each of the locations P1, P2, P3, P4, through Pn and Pm can change over time as the scene in the captured video changes.

To further illustrate the examples given above, a detailed example is described in which the long-term background model 502, short-term background model 504, and foreground model 506 for pixel location P1 are used to generate and update a corresponding pixel location $P1_B$ in a background reference background picture. The long-term background model 502 can include a single Gaussian model, the short-term background model 504 can model short-term background motion between frames, and the foreground model 506 can include a mixture of Gaussians (GMM), as described above. A counter called long_term_motion_counter can be created to count the background motion history of each long-term background motion pixel. The long_term_motion_counter is initially set to 0.

Long-term background motion of the pixel location P1 is detected with the single Gaussian of the long-term background model 502. For example, upon receiving a new picture, the long-term background model 502 can detect background motion and can be updated when pixel intensity changes for pixel locations within the picture are outside of a range (e.g., a range of $[\mu-\alpha\sigma, \mu+\alpha\sigma]$), as described above. The long-term background motion image is denoted as motion_bg. In some examples, motion_bg can include a binary image in which a background location is set to 0 and foreground location is set to 1 (or 255). In another example, the motion_bg binary image can have a foreground location set to 0 and a background location set to 1 (or 255).

Short-term background motion of the pixel location P1 is detected with the short-term background model 504 by determining an absolute difference in intensity of consecutive frames outside of a given range (e.g., a change in intensity $\Delta I$ outside of the range of $[0, T]$), as described above. The short-term background motion image is denoted as motion_pre. In some examples, motion_pre can include a binary image in which a background location is set to 0 and foreground location is set to 1 (or 255). In another example, the motion_ pre binary image can have a foreground location set to 0 and a background location set to 1 (or 255). A counter denoted still_motion_pre_counter is created for each pixel (or unit) location, including pixel location P1. For example, the still_motion_pre_counter for pixel location P1 records the time that a pixel at the location P1 is consecutively still between consecutive pictures (or frames), as determined by the short-term background model 504. The term "still" indicates that there is no background motion for a pixel (or unit) location detected by a long-term background model or a short-term background model (e.g., there is no background motion for a pixel location between pixels of consecutive frames). If short-term background motion is detected (in motion_pre) for a pixel (or unit) location, the still_motion_pre counter is reset to zero for the pixel (or unit) location. Otherwise, if no short-term background motion is detected for a pixel (or unit) location, the still_motion_pre counter is increased by 1 for the pixel (or unit) location.

If a pixel at the pixel location P1 has no motion in motion_bg and motion_pre, the current pixel intensity of the input picture is used to update the corresponding pixel at the pixel location $P1_B$ of the reference background picture. Similarly, if the pixel has motion in motion_bg or motion_pre, the pixel of the background picture at location $P1_B$ corresponding to the current pixel will not be updated for. Accordingly, as previously described, a pixel location of a background picture is updated only when both the long-term background model and the short-term background model for the pixel location detect a change within limited ranges.

If motion is detected in the motion_bg, indicating long-term background motion, the foreground GMM model 506 is updated for the pixel location P1 and the long_term_motion_counter is increased by 1. If the value of long_term_motion_counter is over a threshold, a Gaussian model of the foreground GMM model 506 (e.g., the most probable Gaussian model of the GMM model) will be used to replace the long-term background model 502 for the pixel location P1. The Gaussian model of the foreground GMM model 506 that replaces the long-term background model 502 (e.g., the most probable Gaussian model) will be removed from the foreground GMM model 506 and the long_term_motion_counter is set to 0.

A quick updated background picture can also be used. For example, if the short-term background motion in a current input picture is sparse (e.g., less than x % of the pixel or unit locations have motion, wherein x can be in suitable number, such as 0.01, 0.05, 0.10, 0.15, 0.20, or other suitable number), the whole reference background picture can be updated to be the current input picture (or frame). At the same time, the mean value of the long-term background model can be set to the value of the current input picture (with possible subsampling), and a variance of the long-term background model can remain unchanged. In this case, an additional stable background picture (denoted as the quick_updated_background_picture) may be created as a copy of the just updated target background picture, which is the current input picture in the example above. The quick_updated_background_picture thus includes an actual captured picture, and not a synthetic picture. In some examples, the quick_updated_background_picture can be saved in a separate buffer than the buffer that stores synthetic background pictures.

When the quick_updated_background_picture is available, there can be two candidate reference background pictures (the synthetic target background picture and the quick_updated_background_picture) that can be sent to the video encoding device 416 for use as a reference picture when encoding one or more pictures (e.g., using inter-prediction). The video analytics engine 404 engine can determine whether to send a synthetic target background picture or the quick_updated_background_picture to the video encoding device 416. In some examples, the quick_updated_background_picture can be selected instead of a synthetic background picture. For example, if the time stamp of the quick_updated_background_picture is close to that of the target background picture (e.g., within 0.01 seconds, 0.05 seconds, 0.1 seconds, or any other suitable time) and the scene has much background and/or foreground movement, the video analytics engine 404 can select the quick_updated_background_picture for sending to the video encoding device 416. In such an example, the quick_updated_background_picture will be sent to the encoding device 416 instead of the synthetic target background picture. Otherwise, the current target background picture will be sent.

Figure 6:
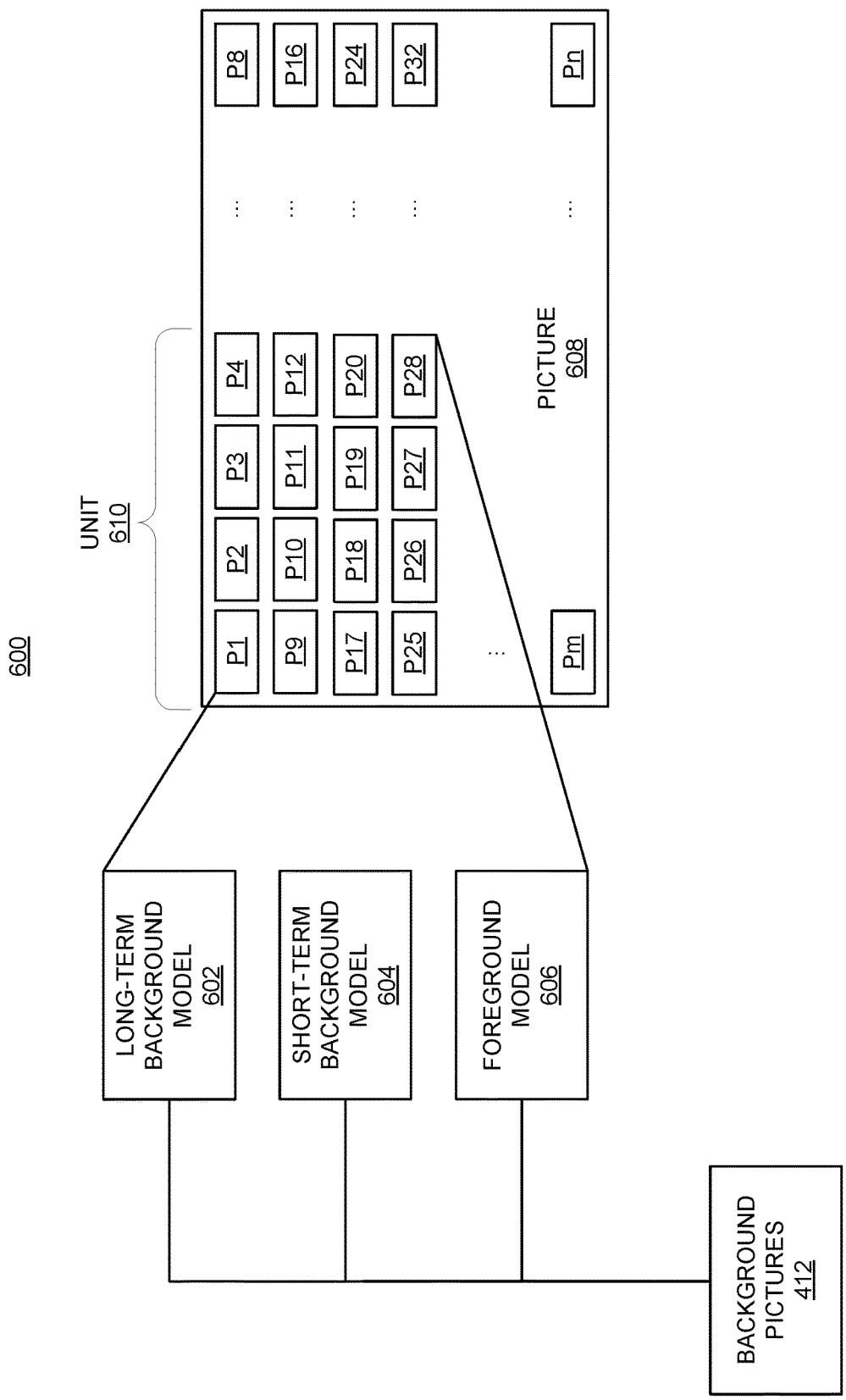
FIG. 6 is an example of a picture including a unit of pixel locations and associated models, in accordance with some embodiments

The detailed example given above can also be applied when a long-term background model, a short-term background model, and a foreground model is maintained for a unit of pixel locations (rather than for a single pixel location). For example, as shown in FIG. 6, a separate long-term background model 602, short-term background model 604, and foreground model 606 can be maintained for a unit 610 of pixel locations in a picture 608. The picture 608 includes pixel locations P1, P2, P3, P4, through Pn and Pm, and can include one picture from the sequence of pictures of the captured video 402 shown in FIG. 4. The locations P1, P2, P3, P4, through Pn and Pm are also present in the other pictures of the sequence of pictures of the captured video 402. The pixel values in each of the locations P1, P2, P3, P4, through Pn and Pm can change over time as the scene in the captured video changes. The unit 610 includes a 4×4 block of pixel locations, including pixel locations P1, P2, P3, P4, P9, P10, P11, P12, P17, P18, P19, P20, P25, P26, P27, and P28.

The long-term background model 602, short-term background model 604, and foreground model 606 can be maintained so that a block of pixels will share the same unit as in the models. For example, if the current resolution of the picture 608 is 3840×2160, and a unit of the long-term model 602 corresponds to a 4×4 block (e.g., as in the luma component), there are 960×540 units for each model and therefore each unit of the model will be processed as if it was one pixel, and all pixel intensities of the corresponding 4×4 block of pixels (the unit 610) are used to determine whether the unit value of the long-term background model 602 is updated. The same concept applies to the short-term background model 604 and the foreground model 606. A virtual picture containing the units is called a modeling picture.

In some examples, the input pictures (or frames) are down-sampled before the whole process is invoked, in which case a unit of a modeling picture corresponds to a pixel in the down-sampled pictures. Any suitable technique for down-sampling a picture can be used. In one illustrative example, a 2×2 image block can be averaged, and the average value can be used to represent a new pixel. In this example, the 2×2 block is downsampled to 1 pixel. In another illustrative example, a Gaussian filter can be applied to filter an image, and then the image can be resampled by picking up one filtered pixel from a 2×2 pixel block. In order to optimize computation speed, the long-term background model 602 and short-term background model 604 can be processed on a down-sampled input picture. For example, each pixel in the background will correspond to N×N pixels in the original image and the reference background picture. When a pixel is detected to be still in both of the long-term background model 602 and short-term background model 604, the pixel can be checked again with short term background motion at the corresponding block on the original consecutive frames (e.g., the current input frame and a prior input frame). Only the pixels having no motion in the N×N block will be updated.

By using long-term background models, short-term background models, and foreground models for a pixel (or unit) location to generate and update a corresponding pixel location in a reference background picture, coding efficiency is improved. For example, even in view of a large amount of motion in the field of view of the capture device, a reference background picture can include minimal or no noise or foreground objects. Such a reference background picture can improve coding efficiency when used to code one or more pictures.

Returning to FIG. 4, the background pictures 414 provided by video analytics engine 404 may be used by the encoding device 416 to benefit the video encoding process. The video encoding device 416 can be similar to and perform the same functions as the encoding device 104 described with respect to FIG. 1. The encoding device 416 can encode one or more pictures (e.g., a random access picture and related pictures) using one or more background pictures as a reference picture. Similarly, a decoding device can use the background pictures to decode the one or more pictures. For example, the background pictures 414 can be coded into a coded video bitstream and used to support random access. With the information from the video analytics engine 404, a coded video bitstream can be stored in storage device 418 or transmitted to a decoding device, a Network Video Recorder (NVR) and/or to any other suitable device.

In some examples, the video analytics engine 404 can start modeling a background picture once the device comprising the video analytics engine 504 (e.g., a camera) is setup to work and can start capturing images. For example, the background picture may begin being modeled and may be generated before the video starts to be encoded and, in some examples, before the video starts to be streamed. In some examples, such a process of modeling a background picture can finish even after the video has started to be encoded by the video encoding device 510. In such embodiments, when background picture is generated and ready, the video analytics engine 404 can feed the background picture to the encoding device 416. In some examples, the video encoding device 416 does not have to wait for the video analytics to finish all processes (including background picture generation) before starting the encoding process. For instance, some high complexity features provided by the video analytics do not need to be accomplished to start the encoding process.

The video analytics engine 404 can feed the background picture to the encoding device 416 based on one or more events. In some examples, a background picture can be sent to the encoding device 416 based on a period of time, such as a given duration of time, a given number of pictures, or other period of time. For example, after a certain period of time or a number of pictures, the video analytics engine 404 can trigger a "background send" event which feeds the background picture to the encoding device 416. In some examples, the video analytics engine 404 can measure the difference between a potential target background picture and a current background picture that is active. For example, the Peak signal-to-noise ratio (PSNR) of the potential target background picture and a current background picture can be measured and compared. If the difference is relatively high (e.g., the PSNR is lower than a threshold), the potential target background picture is generated and the background send event is triggered. In some embodiments, the encoding device 416 can send a "request background picture" command to the video analytics engine 404, which can trigger the background send event.

In some examples, a background picture generated using the techniques described herein is considered as active only in a certain period of time, and can be replaced by a new background picture when the period of time expires. For example, a background picture can be replaced by a new or updated background picture every set period of time (e.g., after 30 seconds, after 1 minute, after 2 minutes, after 5 minutes, or after any other suitable period of time). In some examples, the new background picture may be automatically generated at each set period of time. For example, a background send event can be triggered to feed the new or updated background picture to the encoding device 416 at each period of time. In some examples, a new background picture may be generated when the background of a video sequence has changed by a certain amount (e.g., based on pixel values). In some embodiments, a given number of active background pictures can be maintained in the storage device 418. In one example, up to four background pictures can be maintained in a queue, which can be managed in a First-In-First-Out (FIFO) manner. One of ordinary skill will appreciate that any other suitable number of background pictures can be maintained In some examples, the encoding device 416 can choose to encode or to not encode a received background picture. If the encoding device 416 decides not to encode a potential background picture, an already active background picture can be used. In some examples, a confidence number is sent by the video analytics engine 404 together with a background picture. The confidence number can be interpreted by the video encoding device 416 to quickly decide whether such a picture is to be used to update the active background picture.

Background pictures 414 can be stored in a buffer (e.g., a decoded picture buffer (DPB)) as reference pictures, and can be used for prediction of a PRA picture and, in some instances, other later decoded pictures (pictures that are later in decoding order). In some examples, the storage device 418 can be a DPB.

A predictive random access (PRA) picture can predictively depend on a background picture. In some examples, the encoding device 416 can use at least one of the background pictures 414 as a reference picture for coding a PRA picture. In one example, the encoding device 416 can encode one or more PRA pictures into a video bitstream by performing inter-prediction of the one or more PRA pictures using one or more of the background pictures 414 as reference pictures. For instance, the PRA picture can be compared with the background picture, and the residue or difference between the PRA picture and the background picture can be encoded using inter-prediction techniques. In some examples, a PRA picture can also be coded (as an alternative to inter-prediction based on a background picture) using intra-prediction. A decoding device receiving the video bitstream can decode one or more of the PRA pictures using inter-prediction based on the one or more background pictures 414, which are also provided to the decoding device. For example, when receiving an encoded video bitstream and/or when performing random access, the decoding device can first decode the background picture and can then perform inter-prediction of a PRA picture using the decoded background picture.

By encoding a PRA picture into the video bitstream, random access can be performed based on an inter-predictive PRA picture, instead of only performing random access starting from an intra-predicted (or intra-coded) slice or picture, as is the case under the current video coding standards (e.g., HEVC, AVC, extensions thereof, and other video coding standards). Such a PRA picture is different than an IDR or a CRA picture that may be a P-picture or a B-picture, as these IDR or CRA pictures must belong to a layer with layer ID greater than 0 and can only use inter-layer prediction from other pictures that belong to the same access unit as the IDR or CRA picture and that have a layer ID less than the layer containing the IDR or CRA picture. The PRA picture is different in that it can use inter-layer prediction from a background picture, which may not belong to the same access unit as the PRA picture.

FIG. 7 illustrates a decoded video sequence 700 with PRA pictures and background pictures. The pictures in the video sequence 700 are shown linearly in output order in the direction of the arrow 702, and various time stamps are shown in association with random access pictures, with the smallest unit being second. The picture at time 0:00 is an IDR random access picture. At time 2:15, a background picture is inserted. Due to the presence of an active background picture at least until time 5:02, random access pictures subsequent to the background picture in time can be implemented as a P or a B picture (and does not have to be implemented as an I picture), predicted uniquely from the active background picture inserted at time 2:15 using inter-prediction. Such random access pictures are PRA pictures, and occur at times 2:16, 2:17, 5:01, and 5:02.

FIG. 8 illustrates an embodiment of a process 800 of generating a background picture for coding one or more pictures. In some aspects, the process 800 may be performed by a computing device or an apparatus, such as the video analytics engine 404 or the background extraction engine 406 shown in FIG. 4. In some examples, the computing device or apparatus may include or be part of an encoder, or a processor, microprocessor, microcomputer, or other component of an encoder that is configured to carry out the steps of process 800. In some examples, the computing device or apparatus may include a camera configured to capture the video data. For example, the computing device may include a camera device (e.g., an IP camera or other type of camera device) that includes a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 800 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 802, the process 800 comprises generating a long-term background model for one or more pixels of a background picture. The long-term background model includes a statistical model for detecting long-term motion of the one or more pixels in a sequence of pictures. In one illustrative example, the long-term background model can include a single Gaussian model, as described previously.

At 804, the process 800 comprises generating a short-term background model for the one or more pixels of the background picture. The short-term background model detects short-term motion of the one or more pixels between two or more pictures. In one illustrative example, the short-term background model can compare consecutive frames, as described previously.

In some embodiments, the long-term background model and the short-term background model are generated to represent a single pixel. In some embodiments, the long-term background model and the short-term background model are generated to represent a plurality of pixels of a picture (referred to as a unit of pixels).

At 804, the process 800 comprises determining a value for the one or more pixels of the background picture using the long-term background model and the short-term background model. The background picture is used for coding the one or more pictures. In some embodiments, the background picture is used for coding at least one random access picture. In some embodiments, the process 800 further include providing the background picture to a video encoder. For example, the process 800 can include detecting an expiration of a period of time and providing the background picture to the video encoder upon detecting expiration of the period of time. In another example, the process 800 can include receiving a request for the background picture from the video encoder and providing the background picture to the video encoder upon receiving the request for the background picture. In some embodiments, the process 800 further includes predicting at least the portion of a random access picture using the background picture as a reference picture.

In some embodiments, determining the value for the one or more pixels of the background picture includes updating the value when the long-term background model and the short-term background model indicate no foreground object motion of the one or more pixels in a picture. In some aspects, the process 800 further includes receiving the picture. The picture includes a pixel location corresponding to the one or more pixels. The process 800 further includes determining, using the long-term background model, a long-term change in intensity of at least one pixel in the pixel location. The determined long-term change includes an intensity change within a long-term range. The process 800 further includes determining, using the short-term background model, a short-term change in intensity of the at least one pixel in the pixel location. The determined short-term change includes an intensity change within a short-term range. The short-term change can also or alternatively include a color change. The process 800 includes updating the value for the one or more pixels to a value of the at least one pixel when the long-term change in intensity is within the long-term range and when the short-term change in intensity is within the short-term range. In some aspects, the value for the one or more pixels of the background picture includes a pixel intensity value. In some aspects, the value for the one or more pixels includes a color value. In some examples, the value includes an intensity and a color value.

In some aspects, the process 800 further includes generating a foreground model and using the foreground model to update the long-term background mode, as described previously. The foreground model includes a mixture of statistical models representing one or more pixels of the sequence of pictures. For example, the mixture of statistical models can include a Gaussian mixture model (GMM), as described previously. The process 800 further includes determining long-term motion of the one or more pixels of the sequence of pictures using the long-term background model. The process 800 further includes determining a static state of the one or more pixels of the sequence of pictures using the short-term background model. The process 800 further includes updating the long-term background model using a statistical model of the foreground model.

The background picture generation and coding techniques discussed herein may be implemented in or in conjunction with an example video encoding and decoding system (e.g., system 100). A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of generating a background picture for coding one or more pictures, the method comprising:
   generating a long-term background model for one or more pixels of a background picture, the long-term background model including a statistical model for modeling a background portion of a scene captured by a sequence of pictures;
   generating a short-term background model for the one or more pixels of the background picture, the short-term background model detecting short-term motion of the one or more pixels between two or more pictures, wherein short-term motion of a pixel at a pixel location in the two or more pictures is detected by determining an absolute difference between pixel values of the pixel at the pixel location in the two or more pictures;
   obtaining a picture, the picture including one or more pixels at one or more pixel locations corresponding to the one or more pixels of the background picture; and
   updating one or more values for the one or more pixels of the background picture using the long-term background model and the short-term background model, wherein a value of a pixel at a pixel location in the background picture is updated to a value of the pixel at the pixel location in the obtained picture when the long-term background model detects a long-term change in intensity within a long-term range and the short-term background model detects a short-term change in intensity within a short-term range, and wherein the background picture is used for coding at least one picture.

2. The method of claim 1, wherein the long-term background model is a single statistical model.

3. The method of claim 1,
   wherein the long-term range is based on a mean value of the long-term background for the pixel location and a variation from the mean value; and
   wherein the short-term change in intensity of the pixel at the pixel location ranges from no intensity change up to a threshold intensity change.

4. The method of claim 1, wherein the long-term background model and the short-term background model are generated to represent a single pixel.

5. The method of claim 1, wherein the long-term background model and the short-term background model are generated to represent a plurality of pixels.

6. The method of claim 1, wherein the one or more values for the one or more pixels of the background picture include one or more pixel intensity values.

7. The method of claim 1, further comprising:
generating a foreground model, wherein the foreground model includes a mixture of statistical models representing one or more pixels of the sequence of pictures;
determining long-term motion of the one or more pixels of the sequence of pictures using the long-term background model;
determining a static state of the one or more pixels of the sequence of pictures using the short-term background model; and
updating the long-term background model using a statistical model of the foreground model.

8. The method of claim 1, wherein the background picture is used for coding at least one random access picture.

9. The method of claim 1, further comprising providing the background picture to a video encoder.

10. The method of claim 9, further comprising:
detecting an expiration of a period of time; and
providing the background picture to the video encoder upon detecting expiration of the period of time.

11. The method of claim 9, further comprising:
receiving a request for the background picture from the video encoder; and
providing the background picture to the video encoder upon receiving the request for the background picture.

12. The method of claim 1, further comprising predicting at least a portion of a random access picture using the background picture as a reference picture.

13. The method of claim 1, wherein the long-term background model includes a Gaussian model.

14. The method of claim 13, wherein the short-term background model does not include a Gaussian model.

15. An apparatus for generating a background picture for coding one or more pictures comprising:
a memory configured to store video data; and
a processor configured to:
generate a long-term background model for one or more pixels of a background picture, the long-term background model including a statistical model for modeling a background portion of a scene captured by a sequence of pictures;
generate a short-term background model for the one or more pixels of the background picture, the short-term background model detecting short-term motion of the one or more pixels between two or more pictures, wherein short-term motion of a pixel at a pixel location in the two or more pictures is detected by determining an absolute difference between pixel values of the pixel at the pixel location in the two or more pictures;
obtain a picture, the picture including one or more pixels at one or more pixel locations corresponding to the one or more pixels of the background picture; and
update one or more values for the one or more pixels of the background picture using the long-term background model and the short-term background model, wherein a value of a pixel at a pixel location in the background picture is updated to a value of the pixel at the pixel location in the obtained picture when the long-term background model detects a long-term change in intensity within a long-term range and the short-term background model detects a short-term change in intensity within a short-term range, and wherein the background picture is used for coding at least one picture.

16. The apparatus of claim 15, wherein the long-term background model is a single statistical model.

17. The apparatus of claim 16,
wherein the long-term range is based on a mean value of the long-term background for the pixel location and a variation from the mean value; and
wherein the short-term change in intensity of the pixel at the pixel location ranges from no intensity change up to a threshold intensity change.

18. The apparatus of claim 15, wherein the long-term background model and the short-term background model are generated to represent a single pixel.

19. The apparatus of claim 15, wherein the long-term background model and the short-term background model are generated to represent a plurality of pixels.

20. The apparatus of claim 15, further comprising:
generating a foreground model, wherein the foreground model includes a mixture of statistical models representing one or more pixels of the sequence of pictures;
determining long-term motion of the one or more pixels of the sequence of pictures using the long-term background model;
determining a static state of the one or more pixels of the sequence of pictures using the short-term background model; and
updating the long-term background model using a statistical model of the foreground model.

21. The apparatus of claim 15, wherein the background picture is used for coding at least one random access picture.

22. The apparatus of claim 15, further comprising providing the background picture to a video encoder.

23. The apparatus of claim 22, further comprising:
detecting an expiration of a period of time; and
providing the background picture to the video encoder upon detecting expiration of the period of time.

24. The apparatus of claim 22, further comprising:
receiving a request for the background picture from the video encoder; and
providing the background picture to the video encoder upon receiving the request for the background picture.

25. The apparatus of claim 15, further comprising predicting at least a portion of a random access picture using the background picture as a reference picture.

26. A non-transitory computer readable medium having stored thereon instructions that, when executed by one or more processors, cause the one or more processor to:
generate a long-term background model for one or more pixels of a background picture, the long-term background model including a statistical model for modeling a background portion of a scene captured by a sequence of pictures;
generate a short-term background model for the one or more pixels of the background picture, the short-term background model detecting short-term motion of the one or more pixels between two or more pictures, wherein short-term motion of a pixel at a pixel location in the two or more pictures is detected by determining an absolute difference between pixel values of the pixel at the pixel location in the two or more pictures;

obtain a picture, the picture including one or more pixels at one or more pixel locations corresponding to the one or more pixels of the background picture; and update one or more values for the one or more pixels of the background picture using the long-term background model and the short-term background model, wherein a value of a pixel at a pixel location in the background picture is updated to a value of the pixel at the pixel location in the obtained picture when the long-term background model detects a long-term change in intensity within a long-term range and the short-term background model detects a short-term change in intensity within a short-term range, and wherein the background picture is used for coding at least one picture.

27. The non-transitory computer readable medium of claim 26, wherein the long-term background model is a single statistical model.

28. The non-transitory computer readable medium of claim 27, wherein the long-term range is based on a mean value of the long-term background for the pixel location and a variation from the mean value; and wherein the short-term change in intensity of the pixel at the pixel location ranges from no intensity change up to a threshold intensity change.

29. The non-transitory computer readable medium of claim 26, further comprising instructions that, when executed by the one or more processors, cause the one or more processors to:

generate a foreground model, wherein the foreground model includes a mixture of statistical models representing one or more pixels of the sequence of pictures;

determine long-term motion of the one or more pixels of the sequence of pictures using the long-term background model;

determine a static state of the one or more pixels of the sequence of pictures using the short-term background model; and update the long-term background model using a statistical model of the foreground model.

30. The non-transitory computer readable medium of claim 26, further comprising instructions that, when executed by the one or more processors, cause the one or more processors to predict at least a portion of a random access picture using the background picture as a reference picture.

* * * * *